US008565586B2

(12) United States Patent
Maskatia et al.

(10) Patent No.: US 8,565,586 B2
(45) Date of Patent: Oct. 22, 2013

(54) RECORDER VACATION MODE

(75) Inventors: Imran Arif Maskatia, Hayward, CA (US); Matt Henry Van der Staay, San Jose, CA (US)

(73) Assignee: Microsoft Corporation, Redmond, WA (US)

( * ) Notice: Subject to any disclaimer, the term of this patent is extended or adjusted under 35 U.S.C. 154(b) by 989 days.

(21) Appl. No.: 12/469,457

(22) Filed: May 20, 2009

(65) Prior Publication Data

US 2010/0299681 A1   Nov. 25, 2010

(51) Int. Cl.
*H04N 5/76* (2006.01)
(52) U.S. Cl.
USPC ........................................................ 386/291
(58) Field of Classification Search
USPC ........................................................ 386/291
See application file for complete search history.

(56) References Cited

U.S. PATENT DOCUMENTS

| | | | |
|---|---|---|---|
| 6,756,997 B1 | 6/2004 | Ward, III et al. | |
| 7,088,910 B2 | 8/2006 | Potrebic et al. | |
| 7,369,750 B2 | 5/2008 | Cheng et al. | |
| 7,498,839 B1* | 3/2009 | Jenkins, IV | 326/41 |
| 2006/0173562 A1* | 8/2006 | Verhaegh et al. | 700/86 |
| 2006/0212904 A1 | 9/2006 | Klarfeld et al. | |
| 2007/0077920 A1 | 4/2007 | Weeks et al. | |
| 2008/0084296 A1* | 4/2008 | Kutzik et al. | 340/540 |
| 2009/0051768 A1* | 2/2009 | DeKeyser | 348/143 |
| 2009/0100478 A1 | 4/2009 | Craner et al. | |
| 2010/0150531 A1* | 6/2010 | Corry et al. | 386/123 |
| 2010/0162324 A1* | 6/2010 | Mehta et al. | 725/61 |

OTHER PUBLICATIONS

"WebShifter Gold ", Retrieved at<<http://www.bestshareware.net/download/webshifter-gold.htm>>, pp. 3.
"Buckeye DVR User Manual", Retrieved at <<http://buckeyecablesystem.com/downloads/User_Information/ DVR_UserGuide.pdf>>, pp. 12.
"Scheduling Recordings.", Retrieved at<<http://www.mythtv.org/docs/mythtv-HOWTO-12.html>>, pp. 10.
"TiVo HD XL DVR (150-HD hours)", Retrieved at <<http://reviews.cnet.com/digital-video-recorders-dvrs/tivo-hd-xl-dvr/4505-6474_7-33231115.html>>, pp. 19.

* cited by examiner

*Primary Examiner* — Thai Tran
*Assistant Examiner* — William Tran
(74) *Attorney, Agent, or Firm* — Wolfe-SBMC (57) ABSTRACT

Embodiments of a recorder vacation mode are described. In various embodiments, a recording scheduler is implemented to schedule recordings of media assets according to a standard profile that includes a priority list of the media assets to be recorded. The recording scheduler initiates a user interface for display from which a vacation mode can be enabled to manage recordings of a subset of the media assets when a digital video recorder is likely to be unattended for a duration that is associated with a vacation. The recording scheduler can enable the vacation mode to activate a vacation profile that includes a vacation priority list of the subset of the media assets.

18 Claims, 5 Drawing Sheets

RECORDER VACATION MODE

BACKGROUND

A television client device implemented as a digital video recorder typically includes a scheduling system that manages when media content, such as television programs and movies, are recorded, saved, and deleted. Generally, scheduled recordings are prioritized at the time of recording, but later deleted when storage space is needed for new recordings based on a first-in, first-out assessment. This can result in the untenable effect of deleting earlier recorded media content that may have had a higher priority to a viewer only to save media content that is recorded later, but that has a lower priority to the viewer.

This type of recording management may be undesirable to users that utilize digital video recorders, and particularly for those who may not be able to proactively manage the scheduled recordings on a daily basis. For example, when a user goes on a business trip or on vacation for an extended duration, episodes of daily news shows and other programs may continue to be recorded, filling up the limited amount of storage space available with a digital video recorder. When storage space is needed for new recordings, these lower priority recordings will be saved while earlier recorded movies and first-run programs will be deleted. When a user goes on a business trip or on vacation, it is likely that episodes of a daily news program do not need to be recorded because the user is unlikely to return and watch two-weeks of past news. Contrary, the user will likely want to watch a new movie that was recorded either previous to the user leaving for vacation, or while the user was on vacation, provided that it has not been deleted by the scheduling system.

SUMMARY

This summary is provided to introduce simplified concepts of a recorder vacation mode. The simplified concepts are further described below in the Detailed Description. This summary is not intended to identify essential features of the claimed subject matter, nor is it intended for use in determining the scope of the claimed subject matter.

Embodiments of a recorder vacation mode are described. In various embodiments, a recording scheduler is implemented to schedule recordings of media assets according to a standard profile that includes a priority list of the media assets to be recorded. The recording scheduler initiates a user interface for display from which a vacation mode can be enabled to manage recordings of a subset of the media assets when a digital video recorder is likely to be unattended for a duration that is associated with a vacation. The recording scheduler can enable the vacation mode to activate a vacation profile that includes a vacation priority list of the subset of the media assets. The user interface includes user-selectable vacation settings, and a vacation profile editor having user-selectable profile controls for manipulation to establish the vacation priority list of the subset of the media assets from the priority list of the media assets.

BRIEF DESCRIPTION OF THE DRAWINGS

Embodiments of a recorder vacation mode are described with reference to the following drawings. The same numbers are used throughout the drawings to reference like features and components.

DETAILED DESCRIPTION

Embodiments of a recorder vacation mode provide that a recording scheduler manages which media assets to record, save, and/or delete according to different operation modes, such as a standard or daily mode, a vacation mode, a business-trip mode, and the like. When a user is away from home on vacation or for business, the recording scheduler manages the limited amount of storage space available for a digital video recorder, media asset recorder, portable media player, or other similar device that has limited storage capacity, consumes media assets, and may be configured to automatically download the media assets. The user can simply enable a vacation mode for the device, and the recording scheduler manages the recording, saving, and/or deleting of media assets, such as by preventing lower priority recordings from being scheduled and recorded until the vacation mode is disabled. Accordingly, the user does not have to manually remove media assets from a priority list when going on vacation, and then have to add the media assets to the priority list again when returning from vacation. Additionally, the standard mode settings, priorities, and profiles remain unchanged while the vacation mode is enabled. Embodiments of a recorder vacation mode provide a mechanism to enable and disable the vacation mode for a digital video recorder, media asset recorder, or other similar device, and provide that a user can easily specify a modified recording schedule, such as for use when the user is away and not able to regularly manage the recordings.

While features and concepts of the described systems and methods for a recorder vacation mode can be implemented in any number of different environments, systems, and/or various configurations, embodiments of a recorder vacation mode are described in the context of the following example systems and environments.

Figure 1:
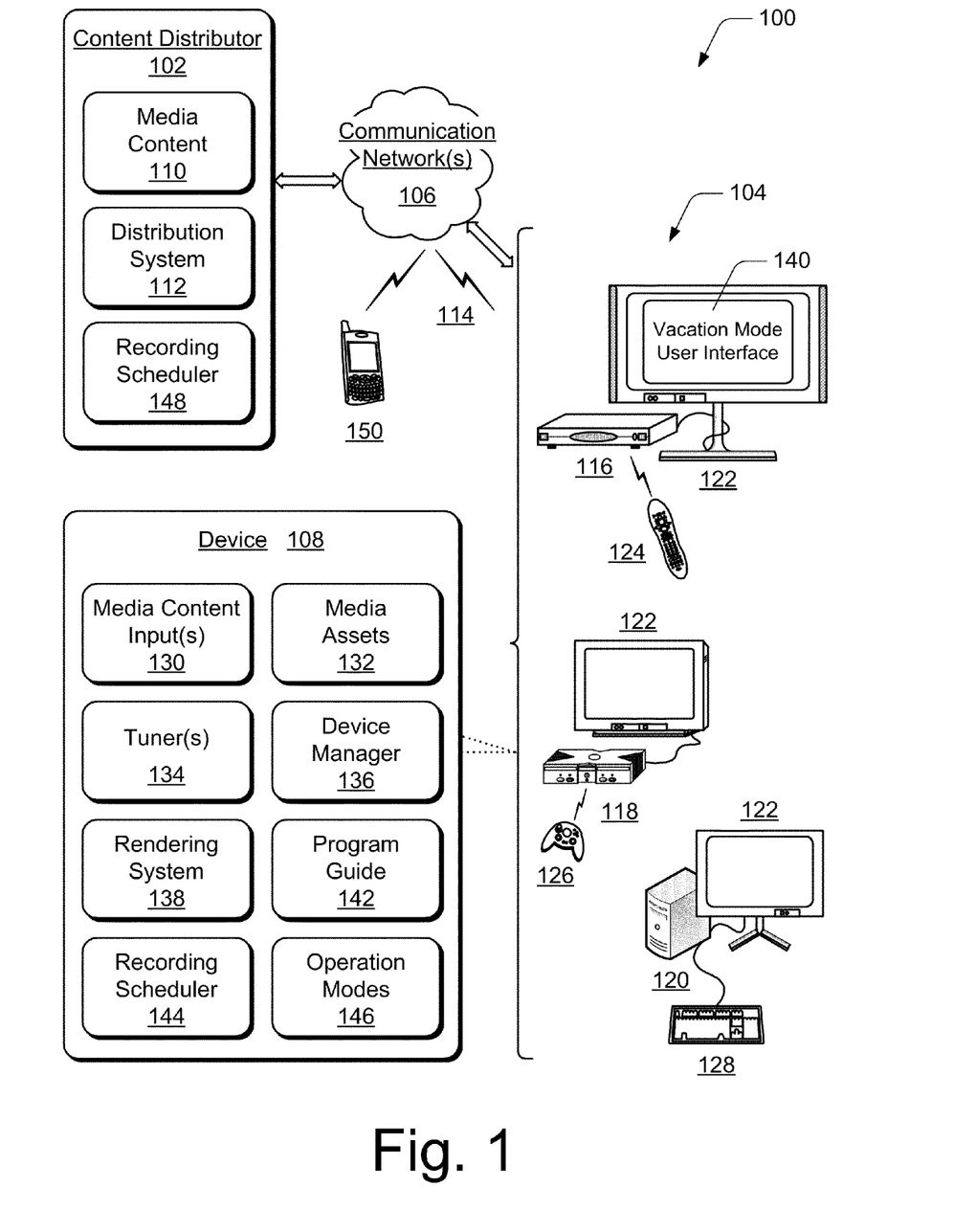
FIG. 1 illustrates an example system in which embodiments of a recorder vacation mode can be implemented.

FIG. 1 illustrates an example system 100 in which various embodiments of a recorder vacation mode can be implemented. System 100 includes a content distributor 102 implemented for media content distribution and communication with various client devices 104 via communication networks 106. An example device 108 is representative of various client devices 104 that receive media content 110 when distributed from content distributor 102. In a media content distribution system, the content distributor 102 includes a distribution system 112 that facilitates distribution of media content, media assets, television content, metadata, and/or other associated data to multiple viewers, users, customers, subscribers, viewing systems, consumer devices, client devices, and the like.

Media content (e.g., to include recorded media content) includes any type of audio, video, and/or image data received from any media content and/or data source as media assets. As described herein, a media asset can include recorded video content, video-on-demand content, television content, television programs (or programming), advertisements, commercials, music, movies, video clips, and other media content. Other media content can include interactive games, network-based applications, and any other content or data (e.g., to include program guide application data, user interface data, advertising content, closed captions data, content metadata, search results and/or recommendations, etc.).

The communication networks 106 include any type of a data network, voice network, broadcast network, an IP-based network, and/or a wireless network 114 that facilitates communication of data and media content in any format. The communication networks 106 can be implemented using any type of network topology and/or communication protocol, and may be represented or otherwise implemented as a combination of two or more networks. In addition, any one or more of the arrowed communication links facilitate two-way data communication.

The various client devices 104 in system 100 can be implemented as any one or combination of a wired and/or wireless device, as any form of television client device 116 (e.g., television set-top box, digital video recorder (DVR), etc.), gaming device 118, computer device 120, portable computer device, consumer device, media device, communication device, video processing and/or rendering device, appliance device, electronic device, and/or as any other type of device that is implemented to receive media content in any form of audio, video, and/or image data. A client device 104 may also be implemented as any type of mobile phone (e.g., cellular, VoIP, WiFi, etc.), a portable media device (e.g., a personal media player, portable media player, handheld media player, etc.), or any other wired and/or wireless device that receives any form of audio, video, and/or image data. A client device may also be associated with a user (i.e., a person) and/or an entity that operates the device such that a device describes logical devices that include users, software, firmware, and/or a combination of devices.

The various client devices 104 shown in system 100 are also implemented as components in client systems that include a respective display device 122. A client device and display device together render and playback any form of audio, video, and/or image data. A display device 122 can be implemented as any type of a television, high definition television (HDTV), LCD, or similar display system. The various client devices 104 (e.g., television, gaming, or computer devices) can also be associated with one or more input devices, such as a remote control device 124 for user-selectable inputs and selections to the television client device 116, a gaming controller 126 for user-selectable inputs to the gaming device 118, and a keyboard 128 and/or mouse input devices for user-selectable inputs to the computer device 120.

The example device 108 is representative of the various client devices 104 that can implement various embodiments of vacation mode. Any of the devices described herein can also be implemented with any number and combination of differing components as described with reference to the example device shown in FIG. 5, such as one or more processors, communication components, data inputs, memory components, processing and control circuits, and/or a media content rendering system.

In this example, device 108 includes media content inputs 130 to receive media assets 132 from content distributor 102. The media content inputs 130 can include any type of communication interfaces and/or data inputs, such as Internet Protocol (IP) inputs over which streams of television content (e.g., IPTV content) are received via an IP-based network. An IPTV receiver can include a media content input 130 to receive television content as an IPTV multicast via an Ethernet input port from content distributor 102. In addition, the media content inputs 130 include any type of broadcast and/or over-the-air inputs via which media content is received over the air. Device 108 also includes one or more tuners 134 to tune television channels and/or data streams for display and viewing. In various implementations, a tuner 134 can be implemented as a hardware tuner, or alternatively, as a software tuner that is implemented to tune to a television channel and/or data stream to receive television media content.

Device 108 is implemented with a device manager 136 that includes any one or combination of a control application, software application, signal processing and control module, code that is native to the particular device, and/or a hardware abstraction layer for the particular device. Device 108 also includes a rendering system 138 to receive and render media content in any form of audio, video, and/or image data received from any media content and/or data source. In various embodiments, the rendering system 138 is implemented to render one or more vacation mode user interfaces 140 for display, such as shown on the display device 122 that is associated with the television client device 116.

The rendering system 138 is also implemented to render a program guide 142 for display on a display device 122 of the client systems. A program guide can include program previews displayed as text, an image, and/or video that corresponds to a respective program and an associated channel and/or data stream. When a vacation mode is enabled in a device, a program guide 142 can include a display of icons to inform a user about media assets that are not recorded, but would otherwise have been recorded in a standard mode. Additionally, a program guide 142 can include various vacation mode status indicators that let a user know at a glance when a digital video recorder, media asset recorder, portable media player, or other similar device is enabled in a vacation mode.

In this example system 100, device 108 includes a recording scheduler 144 that can be implemented as computer-executable instructions and executed by processors to implement embodiments and/or features of a vacation mode when implemented for a digital video recorder, media asset recorder, or similar device. The recording scheduler 144 can instantiate different operation modes 146 that include one or more different profiles having a priority list of media assets to be recorded. In various implementations, the different operation modes 146 can include a vacation mode, a standard mode, a business trip mode, and/or any other designated mode identifier. In an example, the recording scheduler 144 is implemented to schedule media assets to be recorded according to a priority list of media assets in a standard mode of operation. The standard mode can include a standard profile that correlates to a priority list of the media assets to be recorded.

In various embodiments, the recording scheduler 144 is also implemented to enable a vacation mode (e.g., one of the operation modes 146) to activate a vacation profile that correlates to a vacation priority list of media assets to record. In various embodiments, the vacation priority list of media assets is a subset of the media assets that are included in the priority list of the standard profile. The vacation mode can be enabled by the recording scheduler 144 to schedule at least the subset of the media assets to be recorded according to the vacation priority list. In embodiments, the vacation mode is enabled when a digital video recorder, media asset recorder, or similar device is likely to be unattended for a duration that is associated with a vacation of a user of the device.

In an implementation, the unattended duration designated as a vacation is a period of time or number of days that a user associated with a device will be on vacation, or not utilizing the device. In other situations, the user associated with a device may travel for business, where a business trip is a shorter period of time or fewer days than what the user designates as a vacation. In this case, the recording scheduler 144 can be implemented to also enable a business trip mode (or other similar designation) to activate a trip profile that includes a designated list of media assets to be recorded and saved for the duration that the device is likely to be unattended.

The recording scheduler 144 can determine that a digital video recorder, media asset recorder, or similar device has been unattended for a period of time or defined number of days and automatically enable the vacation mode. Alternatively or in addition, the recording scheduler 144 can receive a user-selectable input to enable the vacation mode, such as a user input to television client device 116 with remote control device 124. In various embodiments, the recording scheduler 144 initiates a user interface 140 for display from which the vacation mode can be enabled as a user-selectable input.

From a vacation mode user interface, a user can set-up a recording schedule and vacation priority list to manage recordings of media assets when a digital video recorder or similar device is likely to be unattended for a defined duration that is associated with a vacation. A vacation mode user interface can include one or more user-navigable controls for manipulation to establish the vacation priority list of media assets. A vacation mode user interface can also include one or more user-selectable vacation settings, as well as a vacation profile editor having user-selectable profile controls for manipulation to establish the vacation priority list. Examples of vacation mode user interfaces are described with reference to the user interfaces shown in FIG. 2.

In embodiments, the recording scheduler 144 is implemented to disable the vacation mode for a digital video recorder or similar device when a user-selectable input is received, such as via a vacation mode user interface. The recording scheduler 144 can also be implemented to disable the vacation mode if a device input is detected that indicates the device 108 (e.g., a digital video recorder, media asset recorder, and the like) is not unattended. The vacation mode can be disabled to reactivate the standard mode and record scheduled media assets according to a standard profile that correlates to a standard priority list of the media assets. In various embodiments, the recording scheduler 144 is also implemented to designate when a media asset is to be deleted if recorded while the vacation mode is enabled, as well as designate when a media asset is to be deleted if recorded while the standard mode is enabled (e.g., the vacation mode is disabled).

In alternate embodiments, the content distributor 102 and/or another network-based service can be implemented with a recording scheduler 148 to implement the various features, aspects, and embodiments of a recorded vacation mode, as described with reference to the recording scheduler 144. Further, the implementation of a recording scheduler is applicable for any device that may be constrained by recording resources (e.g., memory, storage space, bandwidth, etc.) and that downloads and records scheduled media assets, such as television programs, movies, music, videos, and the like. In various embodiments of vacation mode, a recording scheduler, such as recording scheduler 144 implemented at device 108 or recording scheduler 148 implemented at content distributor 102, can be managed remotely via a another wired and/or wireless device, such as a computer device, a cell phone 150, laptop computer, or other mobile device.

Figure 2:
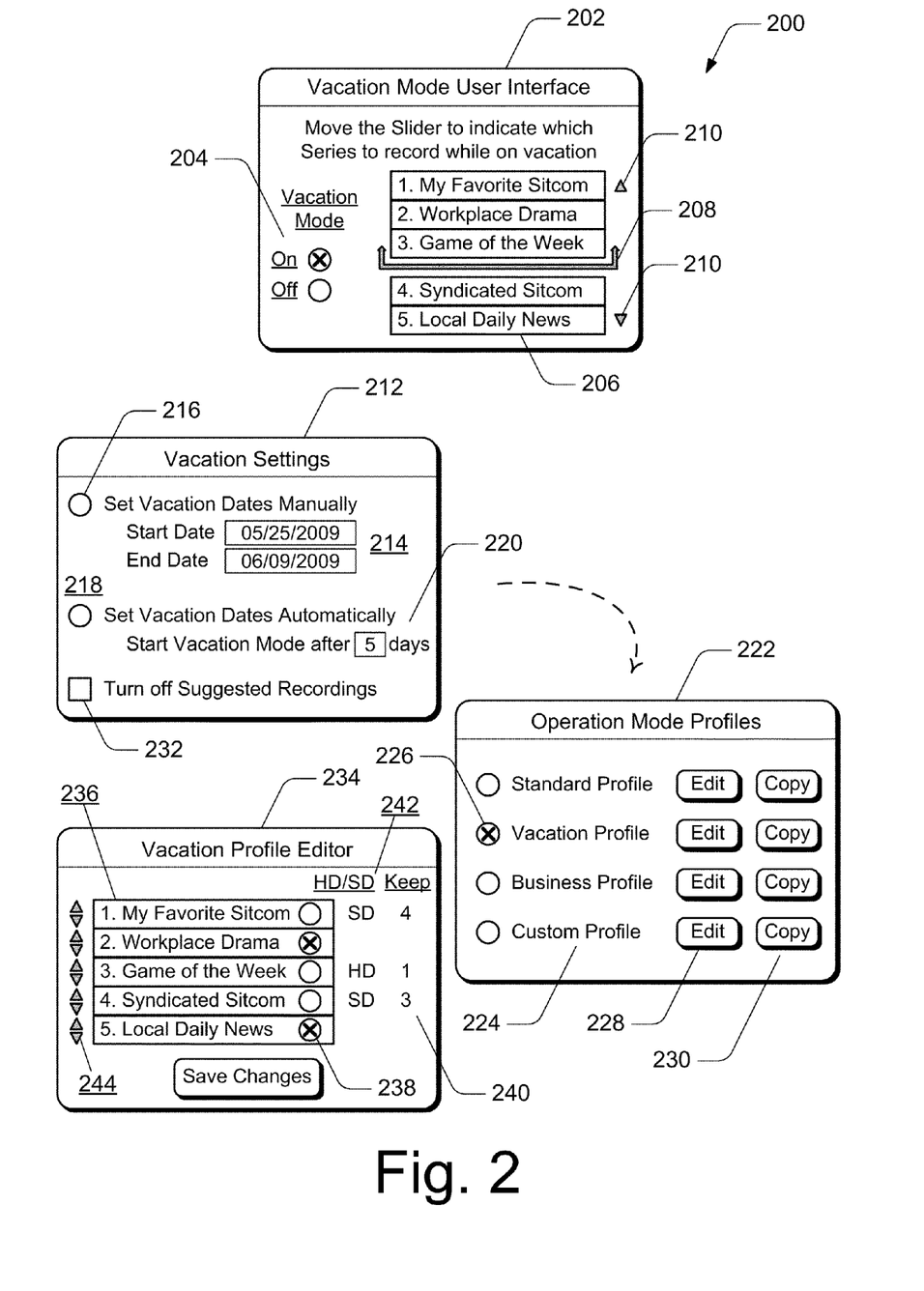
FIG. 2 illustrates example vacation mode user interfaces in accordance with one or more embodiments.

FIG. 2 illustrates example vacation mode user interfaces 200 in various embodiments of a vacation mode. User interface 202 illustrates one example that includes user-selectable controls 204 for selection by a user to enable the vacation mode (i.e., On) or disable the vacation mode (i.e., Off). The user interface 202 also includes a vacation priority list 206 of media assets that are scheduled to be recorded, and includes a divider or partition, referred to herein as a slider 208, that a user can slide up or down in the vacation priority list 206 with user-selectable controls 210. The slider 208 can be set to select a series priority cut-off of the media assets that will be scheduled for recording when the vacation mode is enabled.

Additionally, the user interface 202 can include other selectable controls, such as a navigable selection to a series priority screen from which a user can change the priority of the recordings, as well as modify or update the media assets that are listed in the vacation priority list 206. When a user enables the vacation mode, the digital video recorder, media asset recorder, or similar device will record those media assets that have a series priority above the user selected cut-off as designated by the slider 208.

In various embodiments, the vacation priority list 206 of the media assets is derived from the media assets that are included in the standard priority list of the standard profile. In this example, listed items 1-5 that correlate to various media assets may be included in the standard priority list, and listed items 1-3 above the slider 208 are part of the vacation priority list when the vacation mode is enabled. In an implementation to manage the scheduling and recording of the media assets, the standard priority settings are global and applicable at all times for a device (e.g., digital video recorder, media asset recorder, or similar device).

When the vacation mode is enabled, the recording scheduler does not cancel the standard priority settings that are listed below the vacation recording cut-off (i.e., below the slider 208), but instead designates the media assets as not to be recorded in a vacation mode. When the vacation mode is disabled, the recording scheduler (e.g., refers throughout to recording scheduler 144 at device 108 and/or recording scheduler 148 at content distributor 102) again designates all of the standard priority settings back to the standard mode state for scheduling and recording. Accordingly, the user does not have to manually remove media assets from the priority list when going on vacation, and then have to add the media assets to the priority list again when returning from vacation. Additionally, the standard mode series settings remain intact and are unchanged.

The recording scheduler can track a recording history for media assets when the media assets are designated as not to be recorded in a vacation mode. A user can then view the recording history and see that some media assets were not recorded because they were of a low priority and the vacation mode was enabled when a media asset would have otherwise been recorded. Additionally, a program guide and other recording information user interfaces can include indications that denote vacation mode recordings and settings. For example, the recording history of the media assets can included as part of a program guide, and the recording history can include vacation mode status indicators that let a user know when a digital video recorder, media asset recorder, portable media player, or other similar device is enabled in a vacation mode.

User interface 212 illustrates an example of a vacation settings user interface that includes user-selectable controls for manipulation to manage how the recording scheduler initiates a vacation mode for a digital video recorder, media assets recorder, or similar device. A user can opt to set vacation dates manually at 214 and by selecting to initiate manual control at 216. Although only shown as date settings, the vacation dates can also be implemented to include time settings, such as a vacation start date and time of 05/25/2009 at 7:30 p.m., and/or time settings in various formats. Alternatively or in addition, a user can opt to have the recording scheduler determine when to initiate the vacation mode automatically at 218 and by setting the number of days at 220 to monitor for inactivity, after which the vacation mode is automatically enabled. After the designated period of inactivity, the recording scheduler initiates enabling the vacation mode.

In various implementations, a selection to set the vacation dates manually at 216, or a selection to have the vacation mode determined automatically at 218, can initiate another user interface 222 that includes saved operation mode profiles 224, such as a standard profile, vacation profile, business profile (e.g., for a business-trip mode), and/or any other custom or user-defined profile. Any of the saved profiles 224 can be designated for use when the vacation mode is enabled, such as a selection of the business profile or vacation profile at 226. Any of the saved profiles 224 can also be selected to edit a profile at 228 or to copy a profile at 230, such as when creating a new profile from one of the saved profiles.

The recording scheduler can be integrated with an eventing system of the digital video recorder, media asset recorder, or similar device to monitor for key press events or other indications of device use. If the recording scheduler does not receive an event for the specified time, duration, and/or day interval, it enables the vacation mode and loads the vacation profile into the scheduler. The recording scheduler then continues to monitor for key press events or other indications of use and, when an event is recognized, received, or otherwise determined, disables the vacation mode and reloads the standard profile for scheduling and recording media assets. A user may also choose whether to turn off suggested recordings or other non-user initiated recordings at 232 via the vacation settings user interface 212.

Another vacation mode user interface illustrates an example of a vacation profile editor 234 that includes user-selectable profile controls for manipulation to manage a priority list 236 of the media assets. In an implementation, the vacation profile editor 234 can be initiated from the user interface 222 that includes the saved operation mode profiles 224, such as when a user selects to edit a profile at 228. When a user configures a vacation mode, a new vacation profile can be created and/or a previously saved profile can be utilized as a template to create the vacation profile, as described with reference to user interface 222. The vacation profile editor 234 can include and/or display priority lists of all scheduled recordings of series and the associated priorities.

A user can turn a recording for any particular media asset on or off at 238, set a keep at most value 240, and manage HD/SD (high-definition/standard-definition) recording preferences 242 for each individual recording and/or series in the priority list 236 of the media assets. A user may prefer to record most of the media assets in standard-definition to save available recording disk space. The keep at most value 240 provides that a user can change the number of episode recordings for a particular show or program that a digital video recorder, media asset recorder, or similar device will keep. When the keep at most value is set to less than the non-vacation, standard mode setting, the device can wait until the next recording of the series and then enforce the new lower keep at most settings. Although not shown, the vacation profile editor 234 can also include a selectable preference to designate the episode type for each of the media assets listed in the priority list 236. An episode type designation may be set differently in the vacation mode. An episode type of a media asset designates whether to record a program based on whether it will be the first ever airing of the program, a repeat airing of the program, or a duplicate recording of a new program episode that was previously recorded.

When the vacation mode is disabled, the keep at most settings are reverted back to the standard profile settings and enforced by the recording scheduler. A user can also modify various parameters and/or other settings for a vacation priority list, where the parameters and/or settings are not global, but initiated when the vacation mode is enabled. For example, priority controls 244 can be selected by a user to individually reorder the priority of each media asset listed in the priority list 236 in the vacation profile. When the vacation mode is then disabled, the standard mode settings are restored which provides that a user can have a completely different recording profile while on vacation without having to change daily or standard user settings.

In various embodiments, a recording scheduler can manage multi-user scheduling where one or more users may enable a vacation mode, while the digital video recorder, media asset recorder, or similar device operates in a standard mode associated with other users. The recording scheduler can independently manage the standard and/or vacation profiles of an individual user to schedule and record particular media assets. In an implementation, the least restrictive settings can be implemented if there are scheduled recordings that are duplicated between users.

Example methods 300 and 400 are described with reference to respective FIGS. 3 and 4 in accordance with one or more embodiments of a recording vacation mode. Generally, any of the functions, methods, procedures, components, and modules described herein can be implemented using hardware, software, firmware, fixed logic circuitry, manual processing, or any combination thereof. A software implementation of a function, method, procedure, component, or module represents program code that performs specified tasks when executed on a computing-based processor. The example methods may be described in the general context of computer-executable instructions, which can include software, applications, routines, programs, objects, components, data structures, procedures, modules, functions, and the like.

The methods may also be practiced in a distributed computing environment where functions are performed by remote processing devices that are linked through a communication network. In a distributed computing environment, computer-executable instructions may be located in both local and remote computer storage media, including memory storage devices. Further, the features described herein are platform-independent such that the techniques may be implemented on a variety of computing platforms having a variety of processors.

Figure 3:
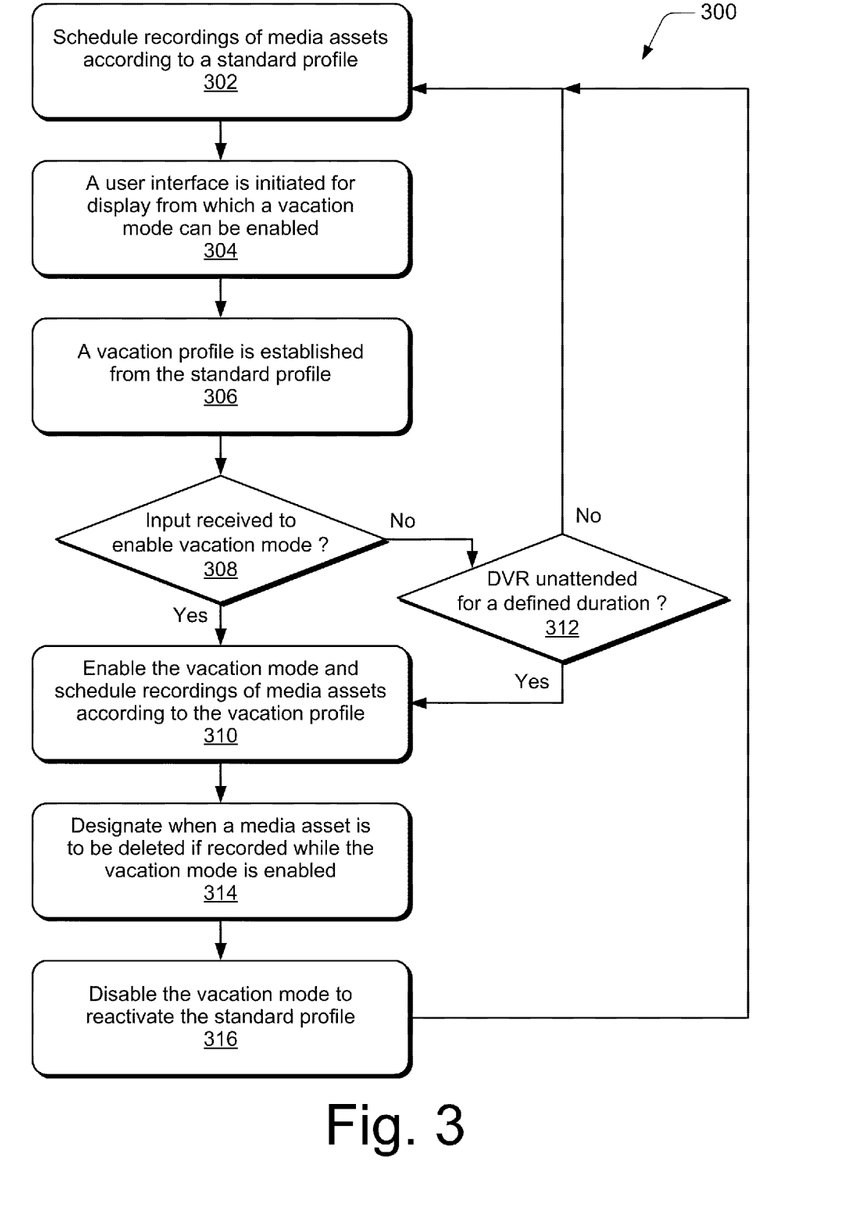
FIG. 3 illustrates example method(s) for a recorder vacation mode in accordance with one or more embodiments.

FIG. 3 illustrates example method(s) 300 for a recording vacation mode. The order in which the method is described is not intended to be construed as a limitation, and any number of the described method blocks can be combined in any order to implement the method, or an alternate method.

At block 302, media assets are scheduled to be recorded according to a standard profile. The standard profile correlates to a standard priority list of the media assets to be recorded. For example, the recording scheduler (e.g., refers throughout to recording scheduler 144 at device 108 and/or recording scheduler 148 at content distributor 102) schedules media assets to be recorded according to a priority list of media assets in a standard mode of operation that includes a standard profile.

At block 304, a user interface is initiated for display from which a vacation mode can be enabled. For example, the recording scheduler initiates a vacation mode user interface 202 via which a user can select to enable a vacation mode. Other vacation mode user interfaces can also be initiated for display, such as the vacation settings user interface 212 and/or the vacation profile editor 234. In various embodiments, a user interface is utilized to manage recordings of media assets listed in a vacation priority list when a digital video recorder, media asset recorder, or similar device is likely to be unattended for a duration or number of days that is associated with a vacation. A user interface can include user-navigable controls for manipulation to establish the vacation priority list of the media assets and/or include user-selectable vacation settings. The vacation profile editor 234 includes user-selectable profile controls for manipulation to establish the vacation priority list of the media assets.

At block 306, a vacation profile is established from the standard profile. For example, the vacation priority list 206 illustrated in the vacation mode user interface 202 that is associated with a vacation profile is established or otherwise derived from a standard priority list that is associated with a standard profile. In an embodiment, a user-selectable input is received via the user interface to establish the vacation priority list as a subset of the media assets from a standard priority list.

At block 308, a determination is made as to whether a user-selectable input is received via the user interface to initiate enabling the vacation mode. For example, the recording scheduler 144 can receive a user-selectable input via the vacation mode user interface 202 to enable the vacation mode, such as a user input to television client device 116 with remote control device 124. If a user-selectable input is received via the user interface (i.e., "yes" from block 308), then at block 310, the vacation mode is enabled and recordings of media assets are scheduled according to the vacation profile.

If a user-selectable input is not received via the user interface (i.e., "no" from block 308), then at block 312, a determination is made as to whether the digital video recorder has been unattended for a defined duration, such as a number of days or weeks. For example, the recording scheduler monitors for inactivity, key press events, or other indications of device use to determine if a digital video recorder, media asset recorder, or other similar device is unattended for a defined time, duration, and/or day interval. If the digital video recorder has not been unattended for a defined duration (i.e., "no" from block 312), then the method continues at block 302 to schedule recordings of media assets according to the standard profile. If it is determined that the digital video recorder has been unattended for the defined duration (i.e., "yes" from block 312), then at block 310, the vacation mode is enabled and recordings of media assets are scheduled according to the vacation profile. For example, the vacation mode is automatically enabled by the recording scheduler.

At block 314, a media asset is designated when to be deleted if recorded while the vacation mode is enabled. For example, the recording scheduler designates when to delete a media asset that is recorded while the vacation mode is enabled which is different than if the media asset is recorded while the standard mode is enabled. At block 316, the vacation mode is disabled to reactivate the standard profile. For example, the recording scheduler disables the vacation mode to reactivate the standard profile if a user-selectable input is received to initiate disabling the vacation mode. The vacation mode can also be disabled if a device input is detected that indicates the digital video recorder is not unattended. The method can then continue at block 302 to schedule recordings of media assets according to the standard profile when the vacation mode is disabled.

Figure 4:
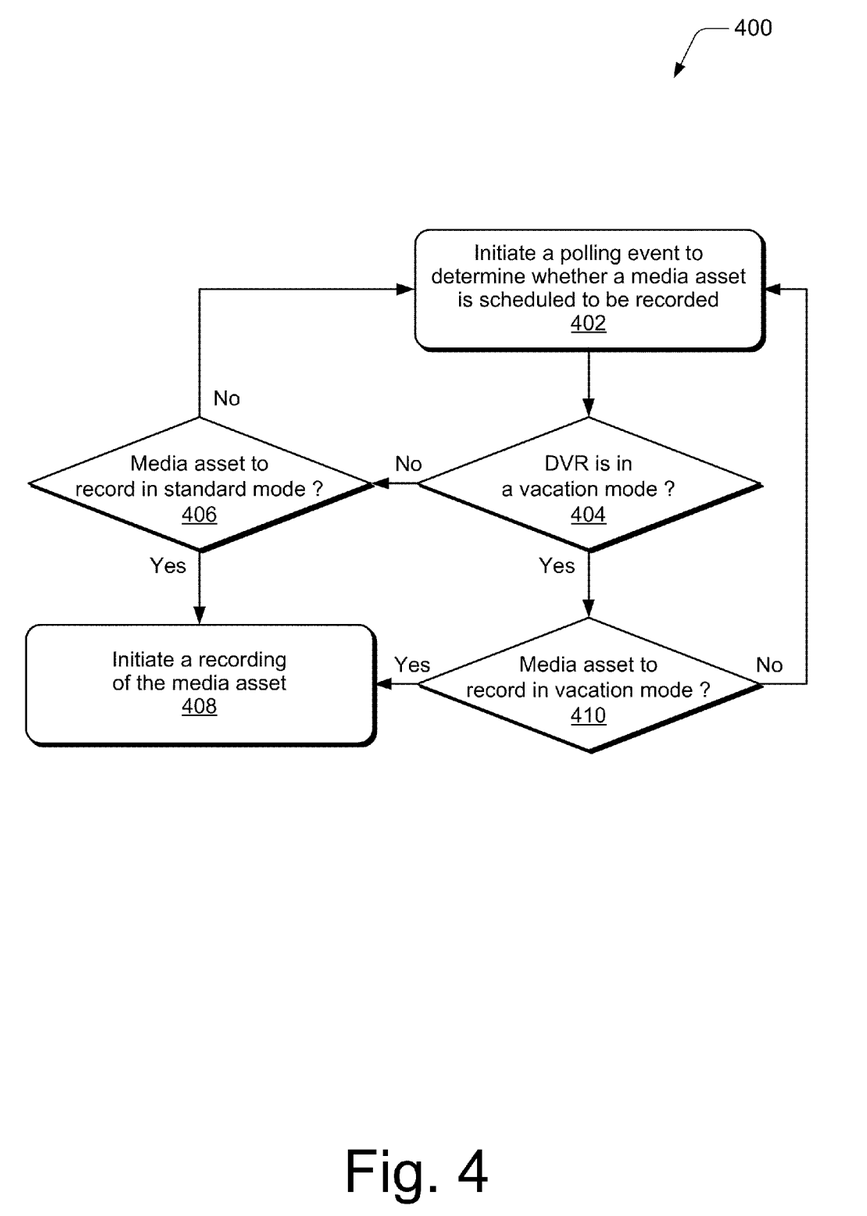
FIG. 4 illustrates example method(s) for a recorder vacation mode in accordance with one or more embodiments.

FIG. 4 illustrates example method(s) 400 for a recording vacation mode. The order in which the method is described is not intended to be construed as a limitation, and any number of the described method blocks can be combined in any order to implement the method, or an alternate method.

At block 402, a polling event is initiated to determine whether a media asset is scheduled to be recorded. For example, the recording scheduler (e.g., refers throughout to recording scheduler 144 at device 108 and/or recording scheduler 148 at content distributor 102) initiates a polling event to determine if a media asset is scheduled to be recorded. As an alternate implementation to a polling-based system that periodically initiates to check whether a media asset is to be recorded, the recording scheduler can be implemented to simply determine a next recording event and communicate a recording instruction to the recorder to begin recording at a designated time and/or date.

At block 404, a determination is made as to whether a recorder is operating in a vacation mode. For example, the recording scheduler determines whether the vacation mode has been enabled in a digital video recorder, media asset recorder, or similar device. If the vacation mode has not been enabled (i.e., "no" from block 404), then at block 406, a determination is made as to whether there is a media asset (also referred to as an event) to record according to a standard mode. For example, the recording scheduler determines whether a media asset is to be recorded when the digital video recorder is enabled in the standard mode (e.g., when the vacation mode is disabled).

If there is not a media asset to record while in the standard mode (i.e., "no" from block 406), then the method continues at block 402 to initiate a polling event to determine a media asset to be recorded. If there is a media asset to record while in the standard mode (i.e., "yes" from block 406), then at block 408, a recording of the media asset is initiated. For example, the recording scheduler initiates recording the scheduled media asset. If the vacation mode has been enabled (i.e., "yes" from block 404), then at block 410, a determination is made as to whether there is a media asset (also referred to as an event) to record according to the vacation mode. For example, the recording scheduler determines whether a media asset is to be recorded when the digital video recorder is enabled in the vacation mode. If there is a media asset to record while in the vacation mode (i.e., "yes" from block 410), then at block 408, a recording of the media asset is initiated. For example, the recording scheduler initiates recording the scheduled media asset. If there is not a media asset to record while in the vacation mode (i.e., "no" from block 410), then the method continues at block 402 to initiate a polling event to determine a media asset to be recorded.

Figure 5:
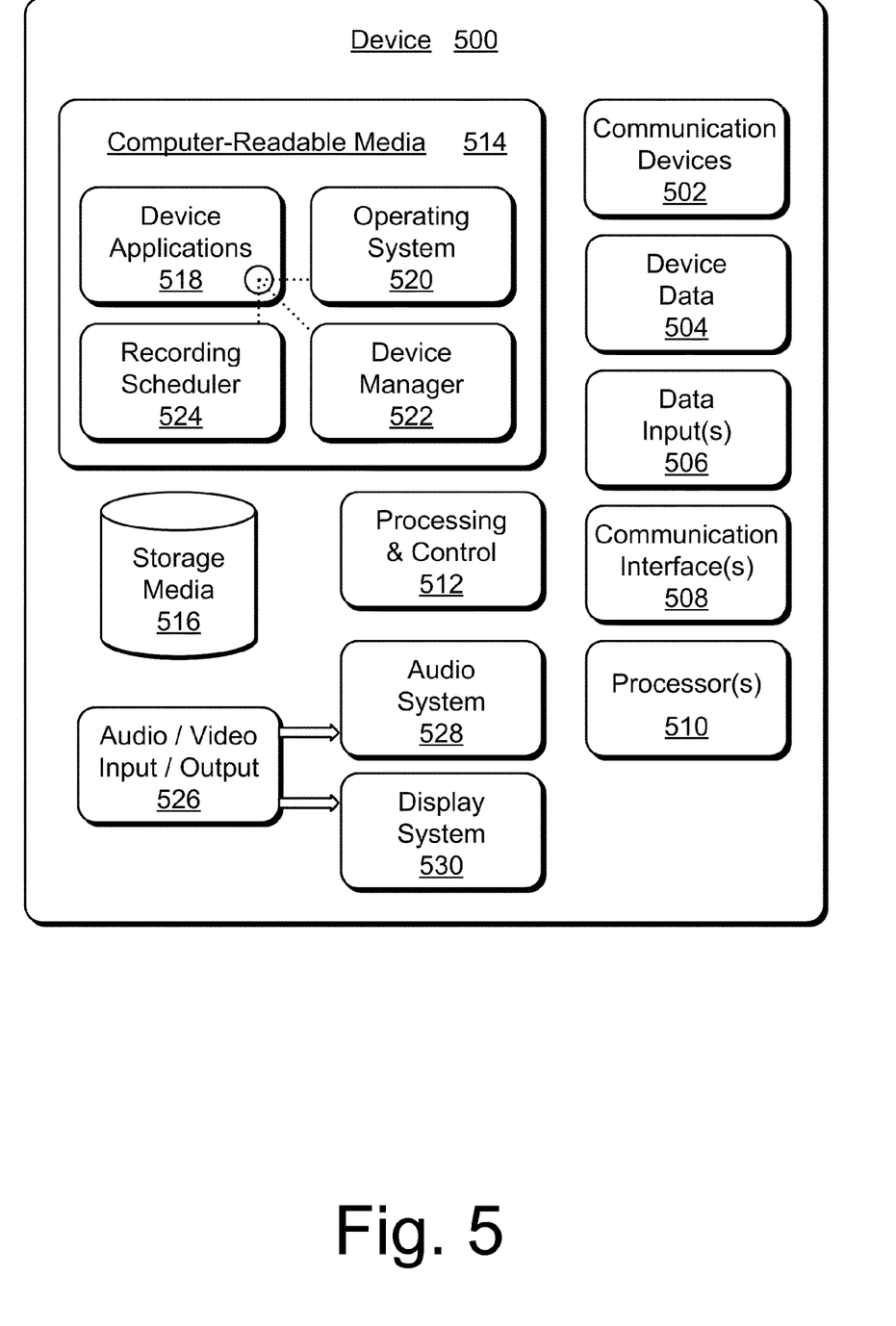
FIG. 5 illustrates various components of an example device that can implement embodiments of a recorder vacation mode.

FIG. 5 illustrates various components of an example device 500 that can be implemented as any type of client device and/or content distributor as described with reference to FIG. 1 to implement embodiments of a recorder vacation mode. In various embodiments, device 500 can be implemented as any one or combination of a wired and/or wireless device, as any form of television client device (e.g., television set-top box, digital video recorder (DVR), etc.), consumer device, computer device, portable computer device, media device, communication device, video processing and/or rendering device, appliance device, gaming device, electronic device, and/or as any other type of device. Device 500 may also be associated with a user (i.e., a person) and/or an entity that operates the device such that a device describes logical devices that include users, software, firmware, and/or a combination of devices.

Device 500 includes communication devices 502 that enable wired and/or wireless communication of device data 504 (e.g., received data, data that is being received, data scheduled for broadcast, data packets of the data, etc.). The device data 504 or other device content can include configuration settings of the device, media content stored on the device, and/or information associated with a user of the device. Media content stored on device 500 can include any type of audio, video, and/or image data. Device 500 includes one or more data inputs 506 via which any type of data, media content, and/or inputs can be received, such as user-selectable inputs, music, television media content, recorded video content, and any other type of audio, video, and/or image data received from a content source.

Device 500 also includes communication interfaces 508 that can be implemented as any one or more of a serial and/or parallel interface, a wireless interface, any type of network interface, a modem, and as any other type of communication interface. The communication interfaces 508 provide a connection and/or communication links between device 500 and a communication network by which other electronic, computing, and communication devices communicate data with device 500.

Device 500 includes one or more processors 510 (e.g., any of microprocessors, controllers, and the like) which process various computer-executable instructions to control the operation of device 500 and to implement embodiments of a recorder vacation mode. Alternatively or in addition, device 500 can be implemented with any one or combination of hardware, firmware, or fixed logic circuitry that is implemented in connection with processing and control circuits which are generally identified at 512. Although not shown, device 500 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 500 also includes computer-readable media 514, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 500 can also include a mass storage media device 516.

Computer-readable media 514 provides data storage mechanisms to store the device data 504, as well as various device applications 518 and any other types of information and/or data related to operational aspects of device 500. For example, an operating system 520 can be maintained as a computer application with the computer-readable media 514 and executed on processors 510. The device applications 518 can include a device manager 522 (e.g., a control application, software application, signal processing and control module, code that is native to a particular device, a hardware abstraction layer for a particular device, etc.). The device applications 518 also include any system components or modules of a recording scheduler 524 to implement embodiments of a recorder vacation mode. In this example, the device applications 518 are shown as software modules and/or computer applications. Alternatively or in addition, the recording scheduler 524 can be implemented as hardware, software, firmware, or any combination thereof.

Device 500 can also include an audio and/or video input-output system 526 that provides audio data to an audio system 528 and/or provides video data to a display system 530. The audio system 528 and/or the display system 530 can include any devices that process, display, and/or otherwise render audio, video, and image data. Video signals and audio signals can be communicated from device 500 to an audio device and/or to a display device via an RF (radio frequency) link, S-video link, composite video link, component video link, DVI (digital video interface), analog audio connection, or other similar communication link. In an embodiment, the audio system 528 and/or the display system 530 are implemented as external components to device 500. Alternatively, the audio system 528 and/or the display system 530 are implemented as integrated components of example device 500.

Although embodiments of a recorder vacation mode have been described in language specific to features and/or methods, it is to be understood that the subject of the appended claims is not necessarily limited to the specific features or methods described. Rather, the specific features and methods are disclosed as example implementations of a recorder vacation mode.

The invention claimed is:

1. A method implemented in a device that executes a recording scheduler, the method comprising:
scheduling recordings of media assets according to a standard profile that includes a priority list of the media assets to be recorded;
designating when one or more of the media assets of the priority list are to be deleted while the standard mode of the digital video recorder is enabled;
initiating a user interface for display from which a vacation mode can be enabled to manage recordings of a subset of the media assets when a digital video recorder is likely to be unattended for a duration that is associated with a vacation;
enabling the vacation mode to activate a vacation profile that includes a vacation priority list of the subset of the media assets;
designating when one or more of the subset of media assets of the vacation priority list are to be deleted while the vacation mode is enabled, the designation of when to delete the media asset being different if recorded while the standard mode is enabled; and
disabling the vacation mode to reactivate the standard profile after detecting a device input that indicates the digital video recorder is not unattended.

2. A method as recited in claim 1, further comprising establishing the vacation profile from the standard profile.

3. A method as recited in claim 1, wherein the user interface includes one or more user-selectable controls configured for manipulation to establish the vacation priority list of the subset of the media assets from the priority list of the media assets.

4. A method as recited in claim 1, further comprising at least one of:
receiving a user-selectable input via the user interface to initiate said enabling the vacation mode; or
determining that the digital video recorder has been unattended for a defined duration and automatically enabling the vacation mode.

5. A method as recited in claim 1, wherein detecting the device input that indicates the digital video recorder is not unattended comprises receiving a user-selectable input to initiate said disabling the vacation mode.

6. A method as recited in claim 1, wherein the user interface includes at least one or more user-selectable vacation settings, and includes a vacation profile editor comprising user-selectable profile controls configured for manipulation to establish the vacation priority list of the subset of the media assets.

7. A method as recited in claim 1, wherein the user interface includes at least one of:
a selectable designation of whether to record the media asset in high-definition or standard-definition to conserve recording media space; or a selectable keep-at-most value that designates a number of episode recordings to save for a particular media asset.

8. A device, comprising:
at least a memory and a processor that implement a recording scheduler that is configured to:
schedule media assets to be recorded and designate when the media assets are to be deleted according to a standard priority list of the media assets; and
enable a vacation mode to schedule a subset of the media assets to be recorded and designate when the subset of media assets are to be deleted according to a vacation priority list, the vacation mode configured to be automatically enabled when a media asset recorder is unattended for a duration of time that is associated with a vacation.

9. A device as recited in claim 8, wherein the recording scheduler is further configured to establish the vacation priority list of the subset of the media assets from the standard priority list of the media assets.

10. A device as recited in claim 8, wherein the recording scheduler is further configured to initiate a user interface for display from which the vacation mode can be enabled as a user-selectable input.

11. A device as recited in claim 8, wherein the recording scheduler is further configured to initiate a user interface for display that includes one or more user-navigable controls configured for manipulation to establish the vacation priority list of the subset of the media assets.

12. A device as recited in claim 8, wherein the recording scheduler is further configured to receive a user-selectable input to enable the vacation mode.

13. A device as recited in claim 8, wherein the recording scheduler is further configured to disable the vacation mode after at least one of a user-selectable input is received to disable the vacation mode, or after a device input is detected that indicates the media asset recorder is not unattended.

14. A device as recited in claim 8, wherein the recording scheduler is further configured to designate when a media asset is to be deleted if recorded while the vacation mode is enabled, the recording scheduler further configured to designate when the media asset is to be deleted if recorded while the vacation mode is disabled.

15. A device as recited in claim 8, wherein the recording scheduler is further configured to initiate a user interface for display that includes one or more user-selectable vacation settings, and includes a vacation profile editor comprising user-selectable profile controls configured for manipulation to establish the vacation priority list of the subset of the media assets.

16. Computer-readable storage memory devices having stored thereon computer-executable instructions that, if executed by a computer device, initiate the computer device to:
initiate a user interface for display from which a vacation mode can be enabled to manage recordings of media assets when a digital video recorder is likely to be unattended for a duration that is associated with a vacation;
determine that the digital video recorder has been unattended for a defined duration of time;
automatically enable the vacation mode to activate a vacation profile that designates the media assets to be recorded according to a vacation priority list of the media assets;
designate when one or more of the media assets that are recorded according to the vacation priority list are to be deleted while the vacation mode is enabled;
detect a device input that indicates the digital video recorder is not unattended;
automatically disable the vacation mode to reactivate a standard profile responsive to detection of the device input; and
designate when one or more of the media assets that are recorded according to a standard priority list are to be deleted while the standard profile is enabled.

17. Computer-readable storage memory devices as recited in claim 16, wherein the computer-executable instructions, if executed, further initiate the computer device to receive a user-selectable input via the user interface to establish the vacation priority list of the media assets.

18. Computer-readable storage memory devices as recited in claim 16, wherein the computer-executable instructions, if executed, further initiate the computer device to receive a user-selectable input via the user interface to enable the vacation mode.

\* \* \* \* \*